United States Patent
Yamakado et al.

(10) Patent No.: US 9,540,003 B2
(45) Date of Patent: Jan. 10, 2017

(54) VEHICLE MOTION CONTROL DEVICE

(71) Applicant: Hitachi Automotive Systems, Ltd., Hitachinaka-shi, Ibaraki (JP)

(72) Inventors: Makoto Yamakado, Tokyo (JP); Mitsuhide Sasaki, Hitachinaka (JP); Mikio Ueyama, Hitachinaka (JP); Keiichiro Nagatsuka, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 14/780,835

(22) PCT Filed: Jan. 24, 2014

(86) PCT No.: PCT/JP2014/051440
§ 371 (c)(1),
(2) Date: Sep. 28, 2015

(87) PCT Pub. No.: WO2014/156256
PCT Pub. Date: Oct. 2, 2014

(65) Prior Publication Data
US 2016/0059852 A1    Mar. 3, 2016

(30) Foreign Application Priority Data
Mar. 29, 2013    (JP) ................................. 2013-070950

(51) Int. Cl.
| B60W 30/00 | (2006.01) |
| B60W 30/09 | (2012.01) |
| B60T 7/00  | (2006.01) |
| B60T 7/12  | (2006.01) |

(Continued)

(52) U.S. Cl.
CPC ................. *B60W 30/09* (2013.01); *B60T 7/12* (2013.01); *B60T 8/1755* (2013.01); *B60W 10/18* (2013.01);

(Continued)

(58) Field of Classification Search
CPC combination set(s) only.
See application file for complete search history.

(56) References Cited

U.S. PATENT DOCUMENTS

2005/0187713 A1*  8/2005  Yamamura ............. G08G 1/167
                                                              701/301
2005/0288844 A1   12/2005  Kimura et al.
(Continued)

FOREIGN PATENT DOCUMENTS

EP    2 060 464 A2    5/2009
EP    2 484 572 A1    8/2012
(Continued)

OTHER PUBLICATIONS

International Search Report (PCT/ISA/210) Issued in PCT Application No. PCT/JP2014/051440 dated Feb. 25, 2014, with English translation (four (4) pages).
(Continued)

*Primary Examiner* — Yonel Beaulieu
(74) *Attorney, Agent, or Firm* — Crowell & Moring LLP

(57) ABSTRACT

In order to reliably assist a driver in emergency detour steering without causing a jerking forward motion of the vehicle during normal operation, a vehicle motion control device includes: a risk potential estimator that estimates a risk potential of a vehicle based on input external information and vehicle information; a vehicle longitudinal motion controller that generates a longitudinal motion control command of the vehicle based on a vehicle lateral jerk and a predetermined gain; and a gain adjustor that adjusts the gain, in which the gain adjustor adjusts the gain based on the risk potential estimated by the risk potential estimator.

18 Claims, 11 Drawing Sheets

(51) Int. Cl.
*B60W 40/107* (2012.01)
*B60T 8/1755* (2006.01)
*B60W 30/045* (2012.01)
*B60W 10/18* (2012.01)
*B60W 10/20* (2006.01)

(52) U.S. Cl.
CPC ............ *B60W 10/20* (2013.01); *B60W 30/045* (2013.01); *B60W 40/107* (2013.01); *B60T 2201/022* (2013.01); *B60T 2201/16* (2013.01); *B60T 2230/04* (2013.01); *B60W 2510/18* (2013.01); *B60W 2510/20* (2013.01); *B60W 2520/10* (2013.01); *B60W 2520/14* (2013.01); *B60W 2710/18* (2013.01); *B60W 2710/20* (2013.01)

(56) References Cited

U.S. PATENT DOCUMENTS

| | | | |
|---|---|---|---|
| 2009/0143951 | A1 | 6/2009 | Takahashi et al. |
| 2010/0222960 | A1* | 9/2010 | Oida ................. B60G 17/0195 701/31.4 |
| 2012/0209489 | A1 | 8/2012 | Saito et al. |
| 2012/0277965 | A1 | 11/2012 | Takahashi et al. |
| 2014/0222309 | A1 | 8/2014 | Yamakado et al. |

FOREIGN PATENT DOCUMENTS

| | | |
|---|---|---|
| EP | 2 492 160 A1 | 8/2012 |
| JP | 2000-353300 A | 12/2000 |
| JP | 2006-7926 A | 1/2006 |
| JP | 2009-51430 A | 3/2009 |
| JP | 2009-262701 A | 11/2009 |
| JP | 2010-162911 A | 7/2010 |
| JP | 2011-73530 A | 4/2011 |

OTHER PUBLICATIONS

English-language translation of Japanese Office Action issued in counterpart Japanese Application No. 2013-070950 dated Jun. 8, 2016 (three (3) pages).

Extended European Search Report issued in counterpart European Application No. 14774788.5 dated Sep. 28, 2016 (seven (7) pages).

* cited by examiner

Fig. 3
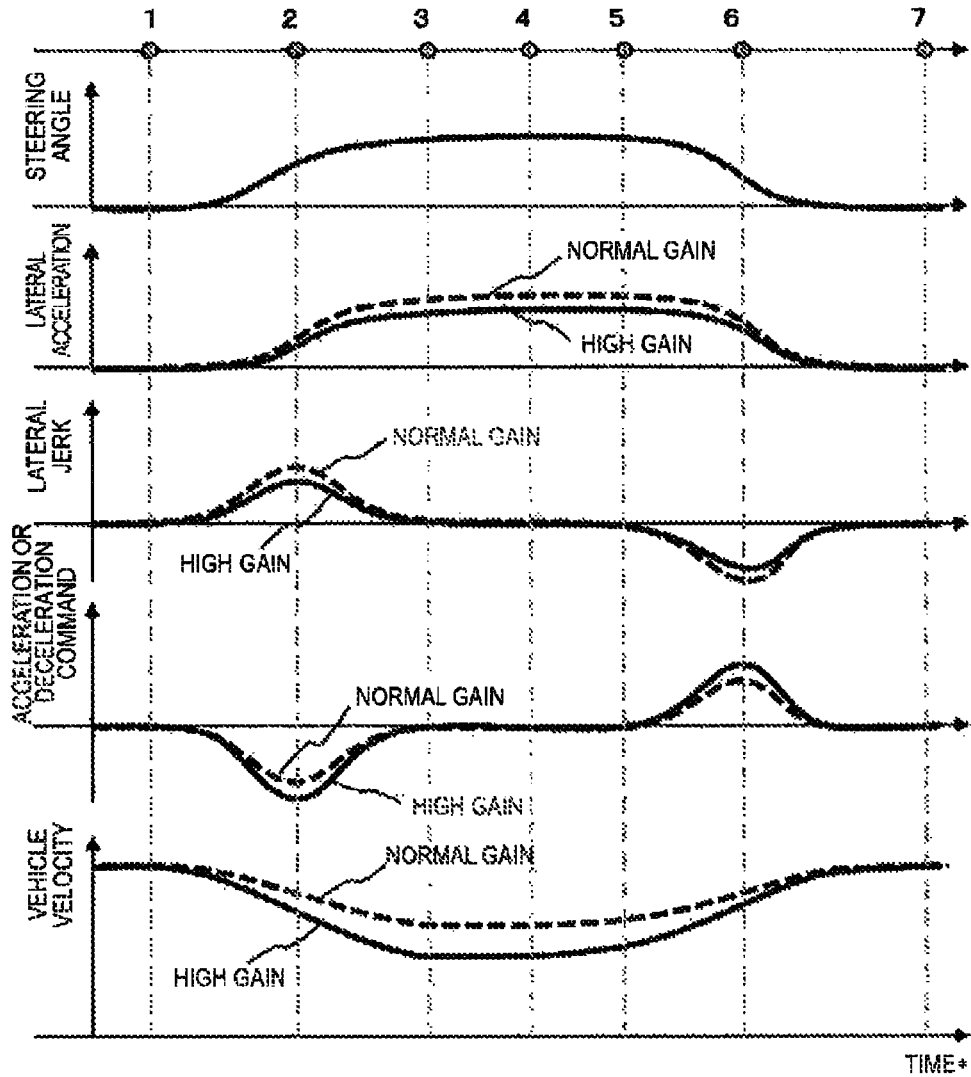
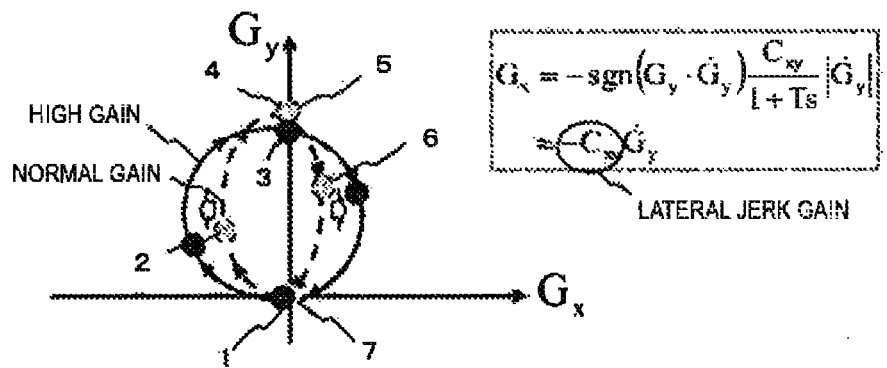

Fig. 11

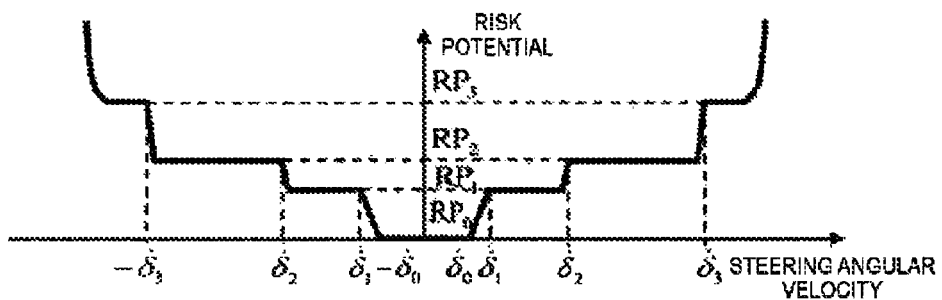

Fig. 12

| | RISK DEGREE |
|---|---|
| RP0 | NO RISK |
| RP1 | POSSIBILITY OF COLLISION IS PRESENT |
| RP2 | POSSIBILITY OF COLLISION IS HIGH |
| RP3 | POSSIBILITY OF COLLISION IS EXTREMELY HIGH |

Fig. 13

| | STRENGTH OF AUTOMATIC BRAKING | SIZE OF LATERAL MOTION LINKAGE GAIN | DISPLAY OF MULTI INFORMATION DISPLAY | BUZZER | VIBRATION (STEER REACTION FORCE, PEDAL REACTION FORCE, OR THE LIKE) |
|---|---|---|---|---|---|
| RP0 NO RISK | NO BRAKE CONTROL | Cxy=0.25 (OR 0) | NO DISPLAY | NO BUZZER | NO VIBRATION |
| RP1 INTER-VEHICLE DISTANCE ALARM | NO BRAKE CONTROL | Cxy=0.40 | WATCH OUT FRONT SIDE | BEEP BEEP BEEP ... | WEAK VIBRATION |
| RP2 FIRST BRAKE AND ALARM | WEAK | Cxy=0.60 | | BEEP BEEP BEEP ... | WEAK VIBRATION |
| RP3 SECOND BRAKE AND ALARM | STRONG | Cxy=0.80 | | CONTINUOUS BEEP | STRONG VIBRATION |

Fig. 17
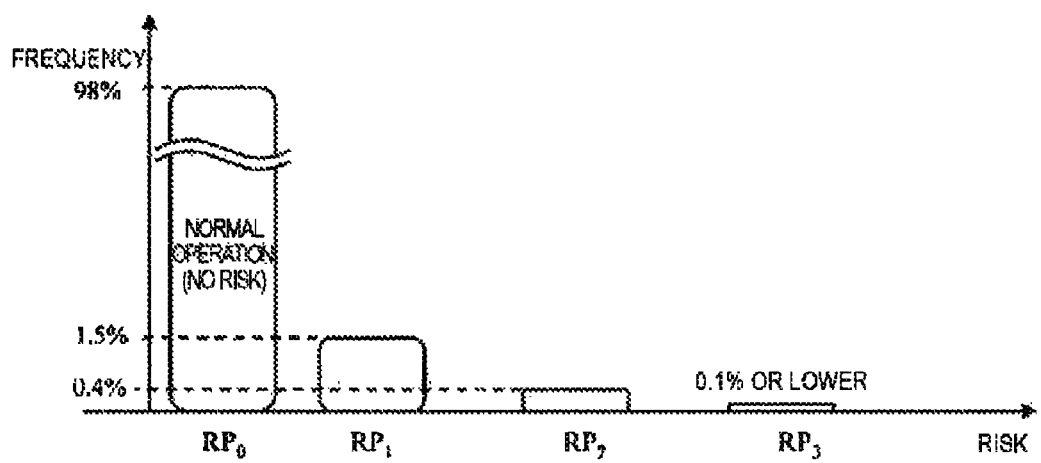
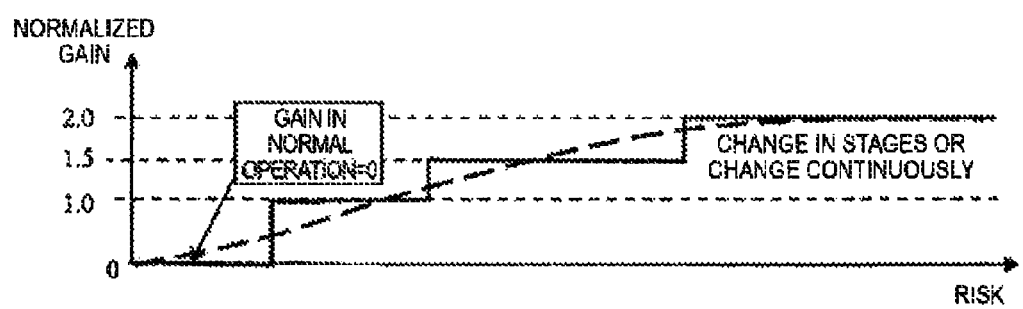
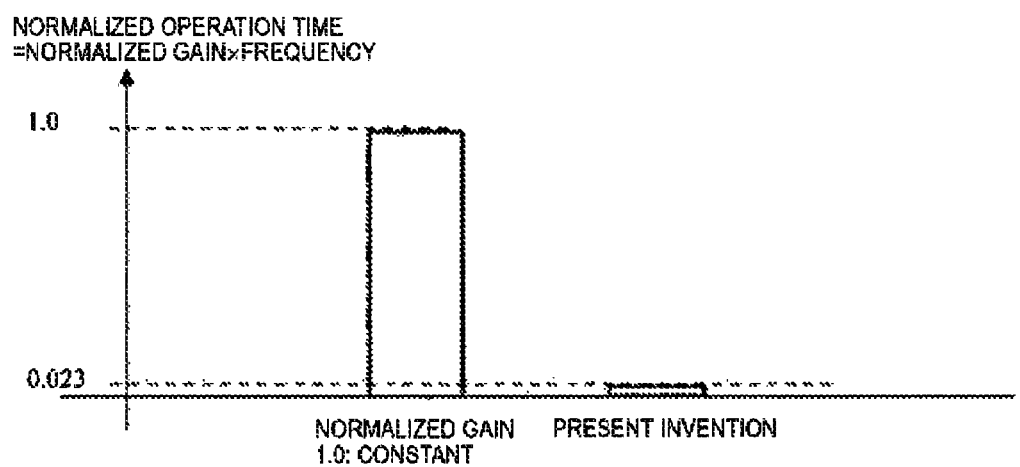

VEHICLE MOTION CONTROL DEVICE

TECHNICAL FIELD

The present invention relates to a vehicle motion control device that controls the longitudinal acceleration of a vehicle.

BACKGROUND ART

In recent years, various automatic braking control devices that prevent collisions by performing an automatic braking control independent of a braking operation of a driver, when there is a high possibility that a host vehicle collides with a control target such as a preceding vehicle, have been proposed and practically used. For example, in PTL 1 discloses a technique of an automatic braking control device based on intervention of automatic braking, which recognizes a control target in front of a host vehicle based on a front road environment captured by a camera, sets a braking intervention distance based on a relative relationship between the host vehicle and the control target, and determines execution of a braking control operation when the relative distance between the host vehicle and the control target is equal to or shorter than the braking intervention distance.

Further, PTL 2 discloses a vehicle motion control method in which an input lateral jerk (Gy_dot) of a vehicle is multiplied by a pre-stored gain (KGyV) which is determined from a velocity (V) and a lateral acceleration (Gy), a control command for controlling a longitudinal acceleration of a vehicle is generated based on a value obtained by the multiplication, and the generated control command is output. According to this method, a locus of a resultant acceleration vector (G) of the longitudinal acceleration and the lateral acceleration is subjected to vectoring so as to draw a smooth curve in a coordinate system in which the center of gravity of the vehicle is fixed, which is referred to as a G-vectoring control (GVC). According to the GVC, it is reported that emergency detour performance is considerably enhanced (NPL 1).

CITATION LIST

Patent Literature

PTL 1: JP-A-2009-262701
PTL 2: JP-A-2000-353300

Non-Patent Literature

Non-Patent Literature 1: Yamakado M., Takahashi J. Saito S.: "Comparison and combination of Direct-Yaw-moment Control and G-Vectoring Control", Vehicle System Dynamics, Vol. 48, Supplement, pp. 231-254, 2012

SUMMARY OF INVENTION

Technical Problem

In the technique disclosed in PTL 1, a braking control unit 5 checks whether a steering angle |δ| from a driver is equal to or greater than a predetermined threshold value δ0, and when it is determined that the steering angle is |δ|≥δ0, the braking control unit 5 sets a prohibit timer tδ for regulating a prohibited time of an enlarged braking control.

Further, the braking control unit 5 checks whether a steering angular velocity |δ'| (=|dδ/dt|) from the driver is equal to or greater than a predetermined threshold value δ'0, and when it is determined that the steering angular velocity is |δ'|≤δ'0, the braking control unit 5 sets a prohibit timer tδ' for regulating the prohibited time of the enlarged braking control.

As described above, in the technique disclosed in PTL 1, when the steering angle or the steering angular velocity from the driver increases, a period of time when the braking control is prohibited is set. That is, when an emergency detour steering operation (in which the steering angle or the steering angular velocity is generally large) from the driver is input, the detour operation is not assisted.

Further, in the GVC disclosed in PTL 2, when a control command value of the longitudinal acceleration of the vehicle, particularly, a deceleration command is built, if the gain (KGyV) to be multiplied by the lateral jerk (Gy_dot) increases, a deceleration basically increases and a velocity during a control operation may considerably decrease, and thus, the detour performance due to steering is considerably enhanced. However, hypersensitive reaction occurs even in response to a minute steering operation during normal operation, which causes the driver to experience a jerking forward motion of the vehicle.

Further, the hypersensitive reaction makes actuator conditions (responsiveness, durability, NVH performance, and the like) during the control operation strict, and causes a cost increase, which narrows a vehicle type range to which the GVC technique can be applied.

An object of the invention is to provide a vehicle motion control device that reliably assists a driver in emergency detour steering without causing a jerking forward motion of the vehicle during normal operation.

Solution to Problem

In order to achieve the above-described object, a vehicle motion control device according to the invention includes: a risk potential estimator that estimates a risk potential of a vehicle based on input external information and vehicle information; a vehicle longitudinal motion controller that generates a longitudinal motion control command of the vehicle based on a vehicle lateral jerk and a predetermined gain; and a gain adjustor that adjusts the gain, in which the gain adjustor adjusts the gain based on the risk potential estimated by the risk potential estimator.

Advantageous Effects of Invention

It is possible to provide a vehicle motion control device that reliably assists a driver in emergency detour steering without causing a jerking forward motion of the vehicle during normal operation.

BRIEF DESCRIPTION OF DRAWINGS

FIG. 3 is a diagram illustrating time-series data showing comparison of a travel condition of a normal gain GVC and a travel condition of a high gain GVC.

FIG. 11 is a diagram illustrating a relationship between a steering angular velocity and a risk potential.

FIG. 12 is a diagram illustrating a qualitative correspondence between a quantified risk potential and a risk degree.

FIG. 13 is a diagram illustrating an operating condition of a system according to the invention based on a quantified risk potential.

FIG. 17 is a diagram illustrating alleviation of conditions with respect to a deceleration actuator that realizes a longitudinal motion associated with a lateral motion.

DESCRIPTION OF EMBODIMENTS

Figure 1:
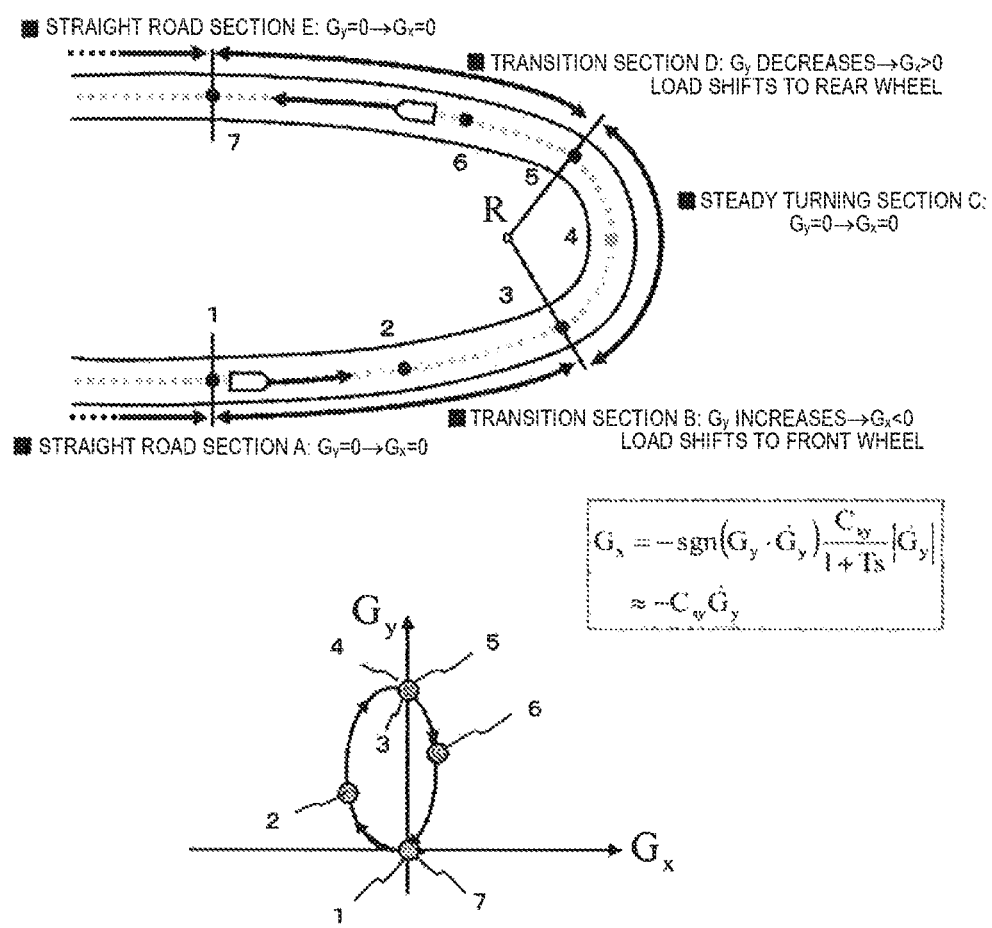
FIG. 1 is a diagram illustrating a state from when a G-Vectoring control (GVC) vehicle enters a left corner to when the vehicle escapes therefrom, according to the invention.

First, a basic approach with respect to means for solving the problems will be described, and then, its configuration and embodiments will be described.

Effects in motion performance enhancement of the invention will be briefly described as follows.

Means for qualitatively evaluating a risk potential based on external information or in-vehicle information is provided. When the risk potential increases, a gain of a longitudinal motion control (deceleration and moment control) associated with a lateral motion is set to be large, compared with a case where the risk potential is small or zero, and thus, a velocity greatly decreases. Further, steering effectiveness of front wheels is enhanced due to load shift or yaw moment control, to thereby enhance emergency detour performance.

First, an outline of the longitudinal motion control associated with the lateral motion will be described, and then, the "gain" to be adjusted will be clarified.

[Longitudinal Motion Control Associated with Lateral Motion]

(1) G-Vectoring

A method in which automatic acceleration or deceleration occurs in association with a lateral motion due to a steering wheel operation to generate load shift between front wheels and rear wheels to thereby enhance controllability and stability of a vehicle is shown in Non-Patent Literature 1. A specific acceleration/deceleration command value (target longitudinal acceleration Gxc) is indicated by the following Expression 1.

$$G_{xc} = -\text{sgn}(G_y \cdot \dot{G}_y)\frac{C_{xy}}{1+Ts}|\dot{G}_y| + G_{x\_DC} \quad [\text{Expression 1}]$$

Expression 1 is a simple control rule for multiplying a lateral jerk Gy_dot by a gain Cxy and setting a value with a first-order lag to a longitudinal acceleration command.

Here, Gy represents a vehicle lateral velocity, Gy_dot represents a vehicle lateral jerk, Cxy represents a gain, T represents a first-order lag time constant, s represents a Laplace operator, and Gx_DC represents an acceleration command which is not associated with lateral motion.

Thus, it is possible to simulate a part of a linkage control strategy of the lateral and longitudinal motions of an expert driver, and to realize enhancement of the controllability and stability of a vehicle, which is confirmed in Non-Patent Literature 1.

Gx_DC in Expression 1 represents a deceleration component (offset) which is not associated with the lateral motion. This is a term necessary for a predictive deceleration when a corner is present in front of the vehicle or necessary when a section speed command is present. Further, a term sgn (signum) is an item provided so that the above-described operation can be obtained with respect to both of a right corner and a left corner. Specifically, it is possible to realize an operation of performing deceleration when turning for a steering start, stopping the deceleration when returning to a steady turning (since a lateral jerk becomes zero), and performing acceleration when escaping from a corner at the time of steering return start.

According to this control, a resultant acceleration (represented as G) of the longitudinal acceleration and the lateral acceleration is subjected to vectoring to shift in a curved form with the lapse of time in a diagram where the longitudinal acceleration of the vehicle is represented on a transverse axis and the lateral acceleration of the vehicle is represented on a longitudinal axis, and is thus referred to as the "G-vectoring control".

A vehicle motion when the control of Expression 1 is applied will be described in consideration of a specific travel scene.

FIG. 1 assumes a general travel scene of entering and escaping from a corner that is formed by a straight road A, a transition section B, a steady turning section C, a transition section D, and a straight section E. Here, it is assumed that an acceleration or deceleration operation of a driver is not performed.

Figure 2:
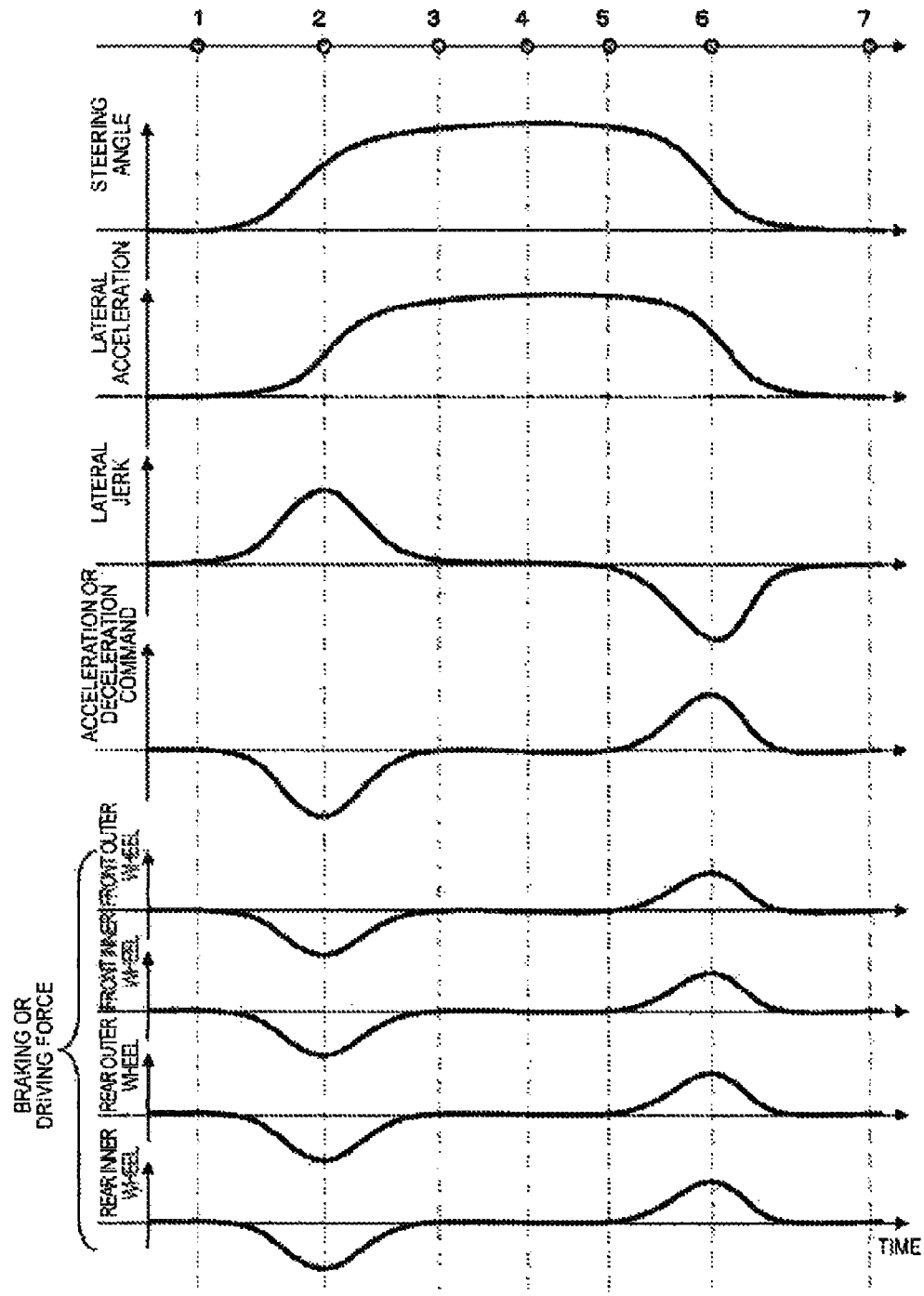
FIG. 2 is a diagram illustrating time-series data when travel shown in FIG. 1 is performed.

Further, FIG. 2 is a diagram illustrating time history waveforms with respect to a steering angle, a lateral acceleration, a lateral jerk, an acceleration command calculated in Expression 1, a braking/driving force of four wheels. As described in detail later, the braking force and the driving force are respectively distributed to have the same value on the left and right sides (inner and outer sides) with respect to a front outer wheel and a front inner wheel, and a rear outer wheel and a rear inner wheel. Here, the braking/driving force collectively refers to a force generated in a vehicle longitudinal direction in each wheel, in which the braking force is defined as a force in a direction where the vehicle is decelerated, and the driving force is defined as a force in a direction where the vehicle is accelerated. First, the vehicle enters the corner from the straight road section A. In the transition section B (from point 1 to point 3), as the driver increases a steering angle in stages, the lateral acceleration Gy of the vehicle increases. The lateral jerk Gy_dot has a positive value while a lateral acceleration around point 2 is increasing (the lateral acceleration returns to zero at point 3 when the lateral acceleration increase ends). Here, a deceleration (Gxc is negative) command is generated in the control vehicle according to the increase in the lateral acceleration Gy based on Expression 1. Accordingly, braking forces (negative) having approximately the same magnitude are applied to the respective wheels of the front outer wheel, the front inner wheel, the rear outer wheel, and the rear inner wheel.

Then, if the vehicle enters the steady turning section C (from point 3 to point 5), the driver stops additional steering, and uniformly maintains the steering angle. Here, since the lateral jerk Gy_dot becomes zero, the acceleration command Gxc becomes 0. Accordingly, the braking force and the driving force of each wheel become zero.

Next, in the transition section D (from point 5 to point 7), the lateral acceleration Gy of the vehicle decreases by a steering return operation of the driver. Here, the lateral jerk Gy_dot of the vehicle is negative, and the acceleration command Gxc is generated in the control vehicle by Expression 1. Accordingly, driving forces (positive) having approximately the same magnitude are applied to the respective wheels of the front outer wheel, the front inner wheel, the rear outer wheel, and the rear inner wheel.

Further, in the straight section E, since the lateral jerk Gy becomes 0 and the lateral jerk Gy_dot also becomes 0, the acceleration/deceleration control is not performed. As described above, the vehicle is decelerated from the turning for steering start (point 1) to the clipping point (point 3), stops the deceleration during steady circular turning (from point 3 to point 5), and is accelerated from the steering return start (point 5) to the escape from the corner (point 7). In this way, if the G-Vectoring control is applied to the vehicle, as the driver performs only steering for turning, it is possible to realize an acceleration or deceleration motion in association with a lateral motion.

Further, if the motion is shown in a "g-g" diagram indicating a state of acceleration generated in a vehicle in which a longitudinal acceleration is represented on a transverse axis and a lateral acceleration is represented on a longitudinal axis, a characteristic motion that shifts in the form of a smoothed curve (to draw a circle) is obtained. The acceleration or deceleration command of the invention is generated to shift in a curved form with the lapse of time in the diagram. The curved shift becomes a clockwise shift as shown in FIG. 1 with respect to the left corner. Further, with respect to the right corner, the curved shift forms an inverted shift path inverted with respect to the Gx axis, and its shift direction is a counterclockwise direction. With such a shift, a pitching motion generated in the vehicle by the longitudinal acceleration and a roll motion generated by the lateral acceleration are preferably linked to each other, and peak values of a roll rate and a pitching rate are reduced.

As shown in FIG. 1, in this control, if the first-order lag term and the signum relating to the right and left motions are omitted, since a value obtained by multiplying the vehicle lateral jerk by a gain −Cxy is set to a longitudinal acceleration command, it is possible to increase a deceleration or an acceleration with respect to the same lateral jerk by increasing the gain.

FIG. 3 is a diagram illustrating a travel condition of a normal gain in the same situation as in FIGS. 1 and 2, and a turning condition in a high gain state where a gain is set to be high. If the gain increases, a deceleration at the time of turning start increases. Thus, compared with a normal gain, a vehicle velocity decreases, and a lateral acceleration decreases with respect to the same steering. Comparison of "g-g" diagrams of a normal gain and a strong gain, which lead to the enhancement of stability during turning, is shown in a lower part of FIG. 3. A curve of the diagram is maintained, but a shape in a Gx direction is expanded, and a shape in a Gy direction tends to be slightly narrowed due to the influence of a decrease in velocity.

On the other hand, if the high gain is constantly maintained, a large acceleration or deceleration is generated with respect to only a minute correction of steering, and thus, a driver and a passenger feel a sudden deceleration and a pitching motion. Accordingly, the gain Cxy of the GVC is normally adjusted to be about 0.25 where the control effect and the driver's feeling are balanced. However, in an emergency lane change or the like, it is confirmed that the detour performance is considerably enhanced by increasing the gain.

(2) Braking Force Control ESC (Electronic Stability Control)

An ESC is a general name of an anti-lock braking system, and refers to a vehicle motion control in which a direct yaw-moment control (DYC) technique is applied to a braking force control.

In U.S. Pat. No. 5,275,475 (PTL 3), a feedback control method is disclosed in which an ideal yaw rate and a lateral acceleration based on a minute steering input are calculated by calculation using a vehicle motion model, the calculated values are compared with a yaw rate measurement value and a lateral acceleration measurement value of an actual vehicle, slip ratios of respective wheels are controlled based on values obtained by multiplying respective differences (side slip information) by predetermined weighting factors, braking forces of the respective wheels are adjusted for right and left wheels, respectively, to generate a yaw moment, so that the ideal motion calculated in the vehicle motion model and the actual motion come close to each other.

Figure 4:
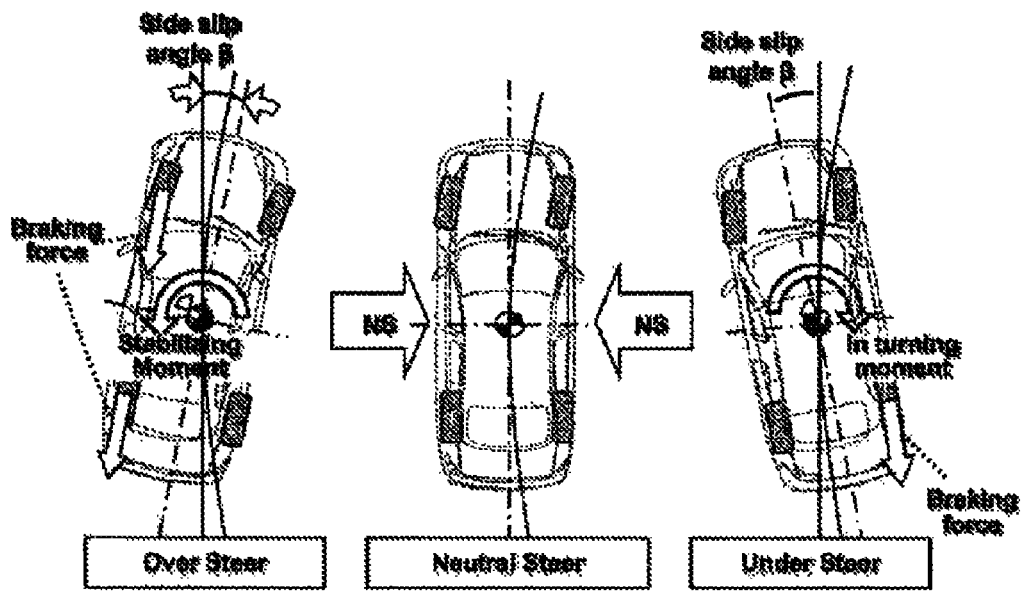
FIG. 4 is a diagram illustrating a basic function of an electronic stability control (ESC).

As shown in FIG. 4, assuming that a state where the yaw rate and the lateral acceleration calculated with respect to the steering input using the vehicle motion model, and the actual yaw rate and lateral acceleration approximately match each other is represented as neutral steering in a broad sense, a system is built so that with respect to a condition where a yaw rate and a lateral acceleration are small with respect to a steering input, that is, an under steering condition, a braking force is generated on a front wheel or a rear wheel on an inner turning side, or on the front wheel and the rear wheel to assign a moment in a direction where the turning is promoted, and contrarily, with respect to a condition where the yaw rate and the lateral acceleration are large with respect to the steering input, that is, an over steering condition, a braking force is generated on a front wheel or a rear wheel on an outer turning side, or on the front wheel and the rear wheel to assign a moment in a direction where the turning is stabilized.

It is considered that this control is realized by estimating a side slip angle $\beta$ in FIG. 4, using a change $\beta\_dot$ (side slip angular velocity) thereof, using values obtained by multiplying appropriate gains, and using a velocity different between the right and left wheels and a longitudinal force difference between the right and left wheels as a yaw moment of the vehicle in a direction where the side slip angle decreases, which may be formulated as Expression 2.

$$M_{z\_ESC} = C_\beta \beta + C_{\dot\beta} \dot\beta = C_\beta \left( \beta + \frac{C_{\dot\beta}}{C_\beta} \dot\beta \right) \qquad \text{[Expression 2]}$$

Here, Cβ and Cβ represent a side slip angle gain and a side slip angular velocity gain.

Accordingly, by quantitatively increasing the side slip angle gain Cβ, it is possible to increase a moment for promoting the turning of the vehicle and a moment for stabilizing the turning of the vehicle, and thus, it is possible to enhance the controllability and stability of the vehicle.

On the other hand, when the high gain is constantly maintained, a large moment input is generated with respect to a minute correction steering, and thus, when the moment is realized using a brake, a driver and a passenger feel a sudden deceleration and a pitching motion. Further, the driver and passengers' awareness of autorotation (a so-called teacup sensation in an amusement park) other than turning also becomes strong.

Accordingly, normally, the gain Cβ of the ESC is adjusted so that the control effect and the driver's feeling are balanced. However, in an emergency lane change or the like, it is confirmed that the detour performance is considerably enhanced by increasing the gain.

Figure 5:
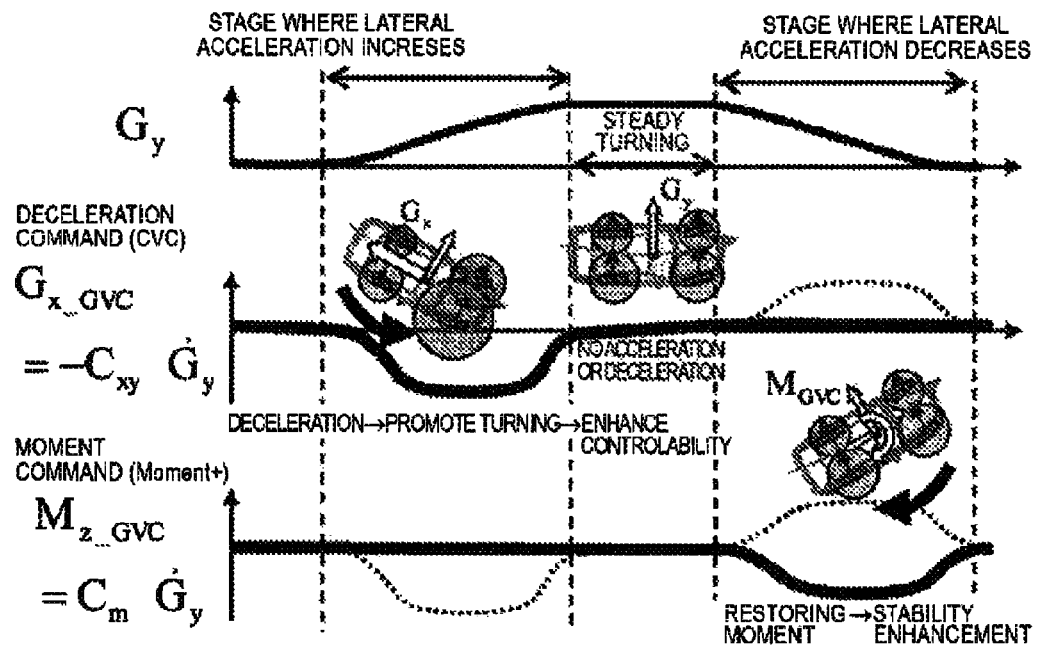
FIG. 5 is a diagram illustrating a basic operation of a moment plus (M+) control rule.

(3) Braking Force Control Moment Plus (Moment+Control) (FIG. 5)

Moment plus is a new control rule for applying a yaw moment to a vehicle based on a G-Vectoring Control (GVC) command value, that is, using lateral jerk information, to thereby enhance controllability and stability of the vehicle, which is reported in "YAMAKADO Makoto, NAGATSUKA Keiichiro, Study on Yaw-moment Control Method Based on Vehicle lateral Jerk Information, Proceedings of the Society of Automotive Engineers of Japan, Inc. (JSAE): 116-12, p. 21-26, Oct. 3, 2012" (Non-Patent Literature 2). A basic control rule of the yaw moment command value M+ is formulated as the following Expression 3.

$$M_+ = -\text{sgn}(G_y \cdot \dot{G}_y)\frac{-C_{mn}}{1+T_{mn}s}|\dot{G}_y| \approx C_{mn}\dot{G}_y \quad \text{[Expression 3]}$$

As shown in Expression 3, in this control, if the first-order lag term and the signum relating to the right and left motions are omitted, since a value obtained by multiplying the vehicle lateral jerk by a gain Cmn is set to a moment command similar to the GVC, it is possible to increase a turning promoting moment or a turning stabilizing moment with respect to the same lateral jerk by increasing the gain.

On the other hand, when the high gain is constantly maintained, a large moment input is generated with respect to a minute correction steering, and thus, when the moment is realized using a brake, a driver and a passenger feel a sudden deceleration and a pitching motion.

Further, the driver and passengers' awareness of autorotation (a so-called teacup sensation in an amusement park) other than turning also becomes strong. Accordingly, normally, the gain Cmn of the moment+ is adjusted so that the control effect and the driver's feeling are balanced. However, in an emergency lane change or the like, it is confirmed that the detour performance is considerably enhanced by increasing the gain.

Further, the stability of the vehicle motion generally is lowered due to the velocity increase. Accordingly, when the turning promoting moment is reduced according to the velocity increase, it may be effective to secure the stability of the vehicle. Accordingly, a method applying a yaw moment command value M+/V so that a control moment is inversely proportional to the velocity is also effective for a vehicle having a tendency to over steer, as indicated by the following $$M_{+/V} = -\text{sgn}(G_y \cdot \dot{G}_y)\frac{-C_{mn}}{1+T_{mn}s}\left|\frac{\dot{G}_y}{V}\right| \approx C_{mn}\frac{\dot{G}_y}{V} \quad \text{[Expression 4]}$$

Since if the velocity decreases, the moment command value considerably increases, a lower speed limit unit that stops the control may be provided, or a method for fixing the amount of control at an extremely low velocity may be used.

Hereinbefore, the longitudinal motion control associated with three lateral motions has been described. The control target is a yaw motion with respect to the ESC and the Moment+, but since acceleration or deceleration (particularly, deceleration when a moment control is performed using a braking force) is generated if the longitudinal force is not in a balanced state in a symmetric manner in a configuration in which a motor is used in the right and left wheels, in the invention, the control target is included in the "longitudinal motion control associated with the lateral motion".

In such a control, the control rule for determining a specific acceleration or deceleration command or a moment command is clearly described. However, for example, a control (velocity follow-up control) for performing deceleration by a continuously variable transmission (CVT) control or the like, based on a difference δv between a current vehicle velocity Vr and a target velocity Vt which is set based on information about a lateral motion or a path curvature, a velocity (speed), and the like, as indicated by the following Expression 5 can be configured.

$$G_{aeb} = K_{aeb} \cdot \delta_v = K_{aeb} \cdot (V_t - V_r) \quad \text{[Expression 5]}$$

In such a control, the period of time until reaching the target velocity is not regulated, it is not possible to calculate a deceleration as a direct command value, and it is not possible to achieve a guarantee of exactly matching a driver's natural steering operation. However, by setting the period of time until reaching the target velocity in a certain range, it is possible to achieve the control effect to some extent. In the invention, it is assumed that the target velocity follow-up control to be indirectly associated with the lateral motion is also included in the "longitudinal motion control associated with the lateral motion".

The longitudinal motion control associated with the lateral motions does not show its effect only when used alone. Particularly, as described above, the ESC and the Moment+ is not only used to control the longitudinal acceleration or deceleration, but is also used to control the yaw motion. Thus, the ESC and the Moment+ may be combined with the GVC for controlling the longitudinal acceleration or deceleration in a non-interfering manner.

Figure 6:
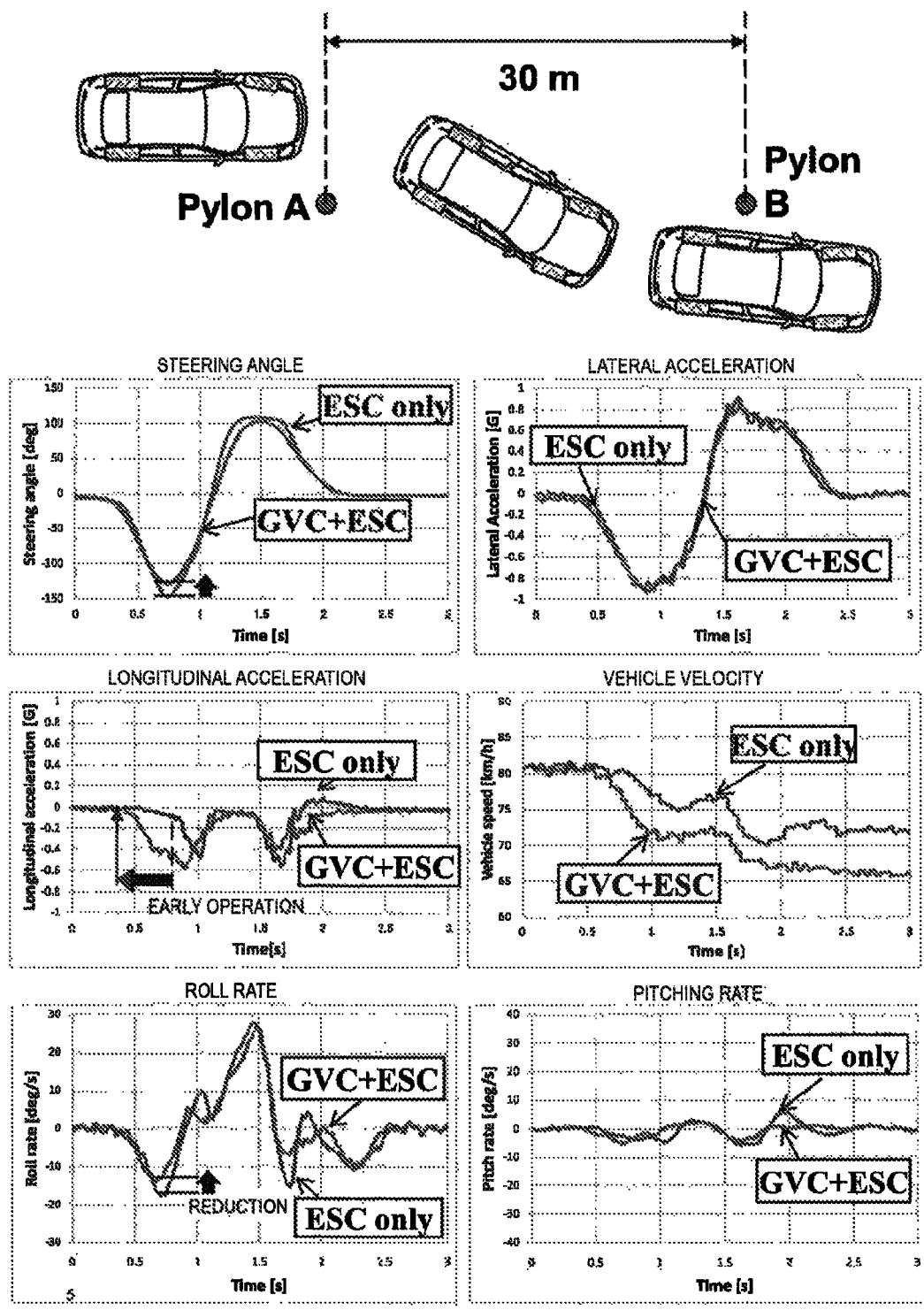
FIG. 6 is a diagram illustrating an operating condition of only an ESC and an operating condition of hybrid control in lane change.

FIG. 6 is a diagram illustrating, when a pylon A and a pylon B are separated from each other at an interval of 30 m and a lane change for escaping from a right side of the pylon A to move to a left side of the pylon B is simulated, comparison between a state where only the ESC is operated with respect to a steering angle, a longitudinal acceleration, a lateral acceleration, and a vehicle velocity and a state where a complex control of the GVC and the ESC is operated. While the ESC detects a side slip state for around 0.75 seconds to 1 second when the steering is rapidly returned to apply a stabilizing moment (occurrence of deceleration), in the linkage control of the GVC and ESC, deceleration is generated from the moment when the steering is started and the velocity decreases by even 10 km/h in 0.5 seconds from the time when the steering is started.

Thus, it can be understood that the steering angle becomes small, a roll rate and a pitching rate are considerably reduced, and a safe lane change can be achieved. Further, as described above, by increasing the jerk gain Cxy and the slip side angle gain Cβ, it is possible to considerably reduce the velocity in an automatic manner with respect to the same task, and to considerably enhance the detour performance.

Further, Non-Patent Literature 2 reports a result of evaluation performed on a compacted snow road based on building of a linkage control of the Moment+, GVC, and ESC. It is reported that, in the linkage control, the motion performance on the compacted snow road is considerably enhanced due to synergetic effects of enhancement of controllability due to the GVC, enhancement of early stability due to the Moment+, and enhancement of absolute controllability and stability due to the ESC, compared with a case where only the ESC is used.

Accordingly, the longitudinal motion control associated with these lateral motions can be considered as an extremely effective control in steering detour.

On the other hand, the longitudinal motion control associated with the lateral motions is operated from a normal region, and thus, the control effect is achieved from the normal region, which shows its characteristic. However, from a totally different viewpoint, in many cases, high noise, vibration and harshness (NVH) performance of an actuator for realizing this control or high durability performance may be required.

For example, in an electric automobile, a hybrid automobile, or the like, when a longitudinal motion control actuator is used as a motor, or when a control booster or an electric brake is used there is no problem in the durability and the NVH performance. However, when the ESC or the like is operated from the normal region, a cost increase is caused in order to solve the above problems. Accordingly, when an ESC with low cost is used, it is necessary to narrow down the operating region and frequency.

The conclusion is as follows.

(1) In the longitudinal motion control associated with the lateral motions, as the gain with respect to the state amounts (lateral jerk, side slip angle change, and the like) characteristically indicating the lateral motions increases, the velocity reduction effect or the like increases, and the detour performance is considerably enhanced.

(2) Since the feeling of jerking forward motion in the normal, region increases if the gain is increased, the control effect and the feeling are gain-adjusted to be balanced.

(3) When there is a problem in the durability of the braking actuator or the NVH performance, it is necessary to reduce the operation frequency.

In the invention, since the gain of the longitudinal motion associated with the lateral motions is greatly adjusted only in a dangerous environment, it is possible to achieve the above-described advantages to the maximum, and to minimize the disadvantages.

Then, a method for quantitatively evaluating a risk potential will be described. Since a hardware configuration of a vehicle is also involved, embodiments of the invention will be described together.

As for the risk potential evaluation, a case where a distance from an obstacle is still distant, that is, a case where a risk is not obvious, and a case where an actual risk occurs so that a detour operation is performed through rapid braking or steering may be considered.

With respect to the evaluation of the former risk potential, external environment recognition sensors that detect environments other than a host vehicle, that is, a relative position, a relative velocity, a relative acceleration, and the like with respect to an obstacle on the straight road are necessary.

With respect to the evaluation of the latter risk potential, it can be considered that the host vehicle encounters a risk when a measurement result of an operation input or a vehicle behavior measured by a steering angle sensor, a brake sensor, an acceleration sensor, or a yaw rate sensor mounted in the host vehicle is rapidly changed.

Further, the enhancement of the emergency detour performance will be considered. In the latter case, there is a possibility that the longitudinal motion control such as automatic braking is directly operated, but in the former case, a detour operation is not performed yet, and a lateral motion does not occur. Here, it should be noted that the enhancement of the emergency detour performance does not include only an assist operation in the emergency detour operation, but also includes a preparation in which when a steering wheel is turned so that a lateral motion is generated, its gain is changed to increase so that a large deceleration is generated (this is similar to an insurance that is not obvious unless a driver or a system turns a steering wheel).

Figure 7:
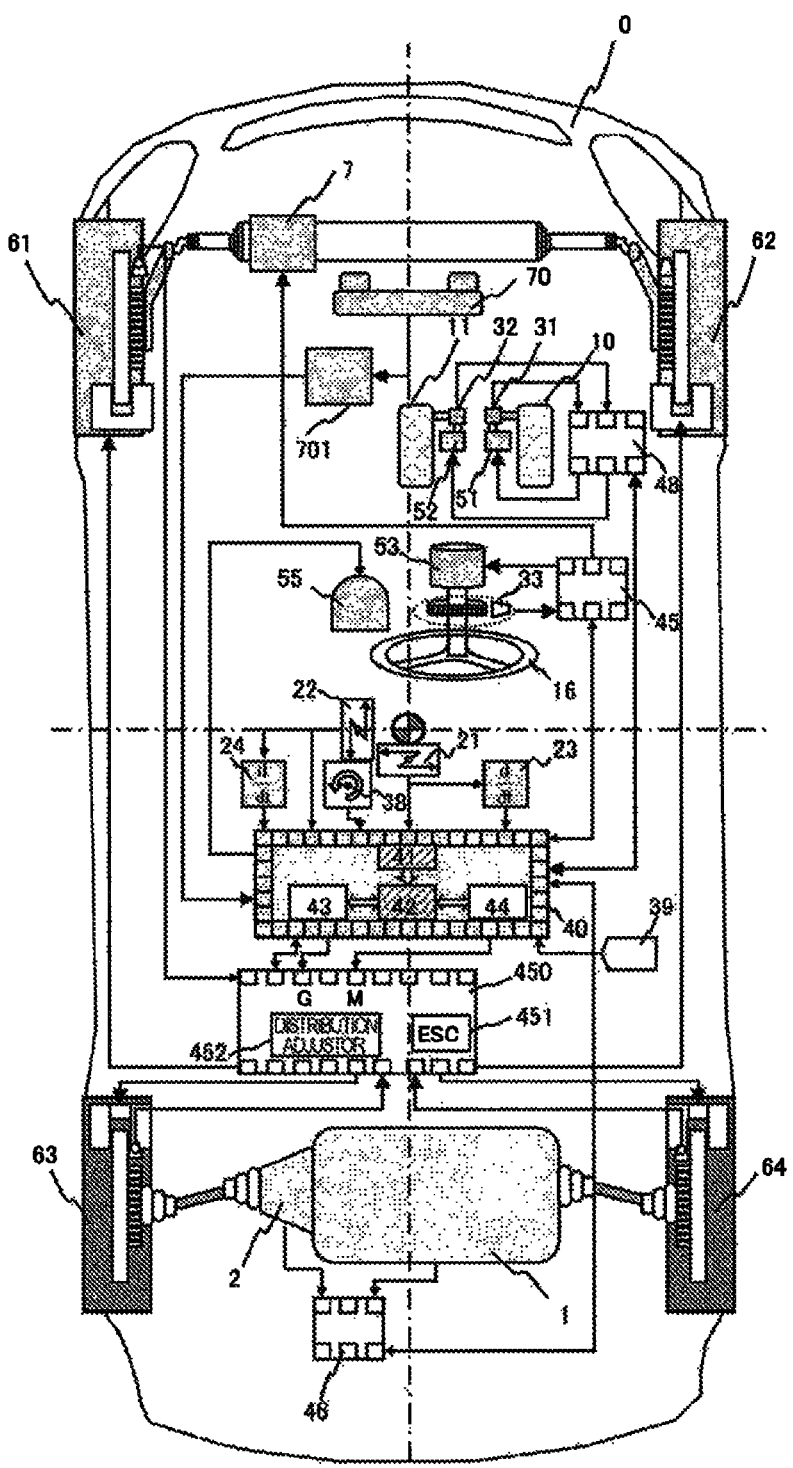
FIG. 7 is a diagram illustrating an overall configuration of a vehicle motion control device according to the invention.

FIG. 7 shows an overall configuration of a first embodiment of a vehicle using the vehicle motion control device of the invention, capable of increasing the gain with respect to the state amounts (lateral jerk, side slip angle change, and the like) characteristically indicating the lateral motions, in order to detect the risk potential which is not obvious and the encountering risk to enhance the emergency detour performance due to the longitudinal motion control associated with the lateral motions.

For most ideal realization, a so-called by-wire system is configured, and a mechanical coupling between a driver, and a steering mechanism, an acceleration mechanism and a deceleration mechanism is not present. In an actual case, the invention may be applied to a configuration in which only a steering mechanism has a mechanical coupling and a driver directly determines a steering angle, for example.

In the present embodiment, a vehicle 0 is a rear engine rear drive (RR car) in which a left front wheel 61 and a right front wheel 62 are driven by an engine 1 (the driving method is not closely and particularly related to the invention).

First, a specific device configuration will be described. A brake rotor and a vehicle wheel velocity detection rotor are respectively mounted in the left front wheel 61, the right front wheel 62, a left rear wheel 63, and a right rear wheel 64, and a vehicle velocity pickup is mounted on a vehicle side to detect a vehicle wheel velocity of each wheel.

A depression amount of an accelerator pedal 10 of the driver is detected by an accelerator position sensor 31, and is operated by an advanced driver assistance system (ADAS) controller 40 through a pedal controller 48. Further, a power train controller 46 controls a throttle, a fuel injection system, or the like (not shown) of the engine 1 according to the depression amount.

Further, an output of the engine 1 is transmitted to the left rear wheel 63 and the right rear wheel 64 through an electronic control transmission 2 controlled by the power train controller 46. The electronic control transmission may be a torque converter type automatic transmission, a wet multiple disk clutch type automatic transmission, a semi-automatic transmission, a continuously variable transmission (CVT), or a dual clutch transmission.

By switching a gear ratio from the engine to each wheel based on a velocity lowering (deceleration) command output from the ADAS controller 40, it is possible to provide a deceleration operation. For example, it is possible to generate the deceleration operation based on a longitudinal motion command "associated with a lateral motion" such as a deceleration or a target velocity command calculated from a road shape such as a curve, or calculated in a GVC (which will be described later).

Further, an accelerator reaction force motor 51 is connected to the accelerator pedal 10, and a reaction force is controlled by the pedal controller 48 based on an operation command of the ADAS controller 40. Further, a rapid accelerator-off operation is detected from a motion in a direction where an accelerator is closed, particularly, from a velocity in the direction where the accelerator is closed, and "quantification of a risk potential using a driver accelerator operation" is performed.

A steering system of the vehicle 0 employs a front wheel steering device, but has a steering by-wire structure in which a mechanical coupling between a steering angle of a driver and a turning angle of a tire is not present. The steering system is configured by a power steering 7 including a steering angle sensor (not shown) therein, a steering wheel 16, a driver steering angle sensor 33, and a steering controller 44.

The amount of steering of the steering wheel 16 of the driver is detected by the driver steering angle sensor 33, and is operated by the ADAS controller 40 through the steering controller 44. Further, the steering controller 44 controls the power steering 7 according to the amount of steering.

Further, a steering reaction force motor 53 is connected to the steering wheel 16, and a reaction force is controlled by the steering controller 44 based on an operation command of the ADAS controller 40. Further, at the same time, the ADAS controller 40 detects rapid steering from the amount of steering operation of the driver, particularly, a steering angular velocity, and "quantification of a risk potential using a driver steering operation" is performed.

The amount of operation (depression amount) of the brake pedal 11 of the driver is detected by the brake pedal potential sensor 32, and is operated by the ADAS controller 40 through the pedal controller 48.

The brake rotor is respectively provided in the left front wheel 61, the right front wheel 62, the left rear wheel 63, and the right rear wheel 64, and a caliper that decelerates the vehicle wheels using a configuration in which the brake rotor is inserted into a pad (not shown) is mounted on the vehicle body side.

The caliper is a hydraulic type, or an electric type in which an electric motor is provided for each caliper. In the case of the hydraulic type, a simple method for generating a hydraulic master cylinder using a hollow motor and a ball screw therein as an actuator may be used instead of a related negative pressure booster, and electric actuation capable of securing a braking force necessary in a natural pedal feeling in cooperation with a regenerative brake based on a travel motor of a hybrid electric automobile or an electric automobile may be used. Further, a multi-pipe plunger pump or a gear pump of an electronic stability control (ESC) corresponding to ITS may be used for pressurization.

Each caliper is basically controlled by a brake controller 450 based on an operation command of the ADAS controller 40. Further, as described above, vehicle information such as a vehicle wheel velocity, a steering angle, a yaw rate, a longitudinal acceleration and a lateral acceleration of each wheel is directly input to the brake controller 450 or through the ADAS controller 40, so that a vehicle velocity V, a vehicle side slip angle, or the like is calculated.

Further, the information is continuously monitored as share information in the ADAS controller 40.

Further, a brake reaction force motor 52 is connected to the brake pedal 11, and its reaction force is controlled by the pedal controller 48 based on an operation command of the ADAS controller 40. At the same time, the ADAS controller 40 detects rapid braking from a brake pedal operation amount of the driver, particularly, from a pedal velocity, and performs "quantification of a risk potential using a driver brake pedal operation".

Next, a motion sensor group of the invention will be described.

As shown in FIG. 7, the lateral acceleration sensor 21 and the longitudinal acceleration sensor 22 are disposed around the center of gravity. Further, differential circuits 23 and 24 that obtain jerk information by differentiating outputs of respective acceleration sensors are mounted. In the present embodiment, in order to clarify the existence of the differential circuit, an example in which the differential circuit is provided in each sensor is shown, but in reality, an acceleration signal may be directly input to the ADAS controller 40 to perform various operation processes, to thereby perform a differential process.

Further, as disclosed in [0082] to [0083] of JP-A-2011-7353, a lateral jerk may be obtained using a yaw rate and a lateral acceleration estimated using a vehicle velocity, a steering angle, and a vehicle motion model, or may be obtained by combining these values by a select-by process or the like, for example. Further, a configuration in which estimation accuracy is enhanced by a vehicle motion model using a signal of a yaw rate sensor 38 may be used.

Further, using the motion sensor group, a state of a road surface (friction coefficient or the like) is estimated, or a road surface gradient or the like is estimated, and thus, "quantification of a risk potential with respect to a travel environment" is performed. Here, it should be noted that in a downward slope with a large road surface gradient, a risk potential is high and it is preferable that a lateral motion linkage gain is increased, but when a road surface friction coefficient is low, a risk potential is high, but if a lateral motion linkage gain is increased, a risk of vehicle locking occurs. Accordingly, in such a case, it is necessary to increase the gain, and to combine a vehicle wheel over slip prevention control as disclosed in Japanese Patent No. 4920054.

Further, a human vehicle interface (HVI) 55 that transmits driver assistance information (system operation information) is mounted in the vehicle 0. The HVI 55 transmits the system operation information to the driver using plural means in cooperation with a screen or an alarm capable of being viewed by the driver, or a reaction force control of each pedal.

Further, a stereo camera 70 and a stereo image processing unit 701 are mounted in the vehicle 0. The stereo camera 70 is configured by CCD cameras which are two imaging elements provided in the transverse direction.

The two CCD cameras are disposed, for example, in a form that a room mirror (not shown) inside the vehicle is interposed therebetween to individually capture an object in front of the vehicle from different coordinates of a vehicle fixing system, and to output two pieces of image information to the stereo image processing unit 701. Here, the CCD cameras are used, but CMOS cameras may be used.

To the stereo image processing unit 701, the image information from the stereo camera 70 is input, and a vehicle velocity V from the brake controller 450 is input through the ADAS controller 40. The stereo image processing unit 701 recognizes front information such as three-dimensional object data or white line data in front of the vehicle 0 based on the image information from the stereo camera 70 to estimate a travel lane of the host vehicle, based on the input information.

Further, the stereo image processing unit 701 checks whether a three-dimensional object such as an obstacle or a preceding vehicle is present on a lane where the host vehicle is traveling, recognizes a three-dimensional object which is closest thereto as an obstacle for prevention of collision, and outputs the result to the ADAS controller 40. Further, the ADAS controller 40 performs "quantification of a risk potential due to external information" based on a host vehicle velocity, a relative position, a relative velocity, a relative acceleration, and the like (referred to as traveling environment data).

Figure 8:
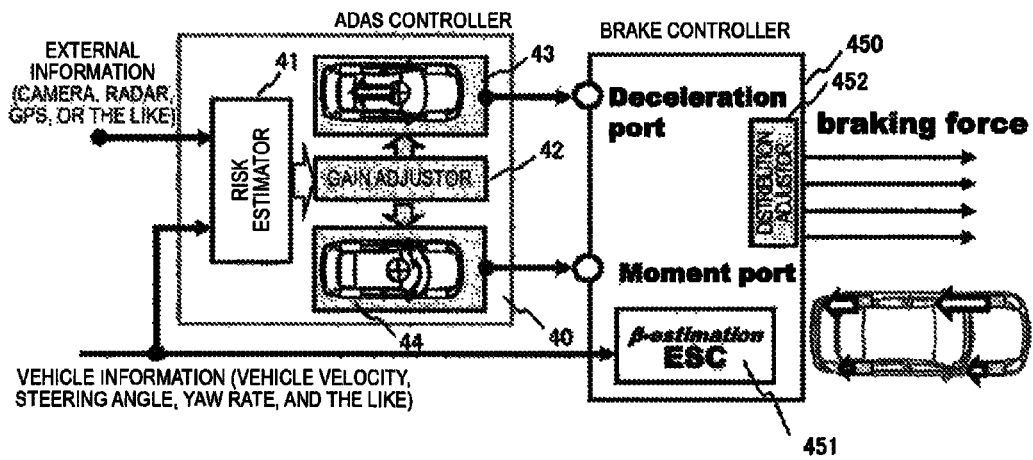
FIG. 8 is a diagram illustrating an internal configuration of an ADAS controller and a brake controller.

FIG. 8 shows an internal configuration of the ADAS controller 40 and the brake controller 450 of the invention. The brake controller 450 includes ports for ACC, deceleration control input capable of pre-crash braking, and yaw moment input for a vehicle lane departure prevention system, as a basic configuration. If a control command is input to the brake controller 450 by a proper method based on input/output information from an I/O port of a control area network (CAN), it is possible to control the deceleration and yaw moment of the vehicle. Here, since a yaw moment command due to an original ESC operation is also generated, a logic for performing an intervention operation (four-wheel braking force distribution) such as temporary invalidation based on an upper limit value set for a command on the input port side may be combined.

The ADAS controller 40 includes a risk potential estimator 41 that imports external information (outside-world information) such as a captured image, distance information, a distance image, a relative velocity, a relative distance, or an obstacle obtained from a stereo camera, a radar, a GPS or the like, and vehicle information such as a velocity, a steering angle, an acceleration, or a yaw rate and estimates a risk degree (risk potential). Further, the ADAS controller 40 includes an acceleration/deceleration controller 43 and a yaw moment controller 44. In the present embodiment, a GVC logic is inserted into the acceleration/deceleration controller 43, and a "longitudinal motion associated with lateral motions" is calculated as an acceleration or deceleration command value based on Expression 1. A moment plus logic is inserted into the yaw moment controller 44, and a "longitudinal motion associated with lateral motions" is calculated as a yaw moment command value based on Expression 3.

That is, the ADAS controller 40 which is the vehicle motion control device of the invention includes the risk potential estimator 41 that estimates the risk potential of the vehicle based on the input external information and vehicle information, a vehicle longitudinal motion controller (the acceleration/deceleration controller 43 and the yaw moment controller 44) that generates the longitudinal motion control commands of the vehicle based on the lateral jerk of the vehicle and a predetermined gain, and a gain adjustor 42 that adjusts the gain. The gain adjustor 42 has a characteristic of adjusting the gain based on the risk potential estimated by the risk potential estimator.

Further, in the ADAS controller 40, the gain adjustor 42 adjusts gains (the vehicle lateral jerk gain (first gain) Cxy in Expression 1 in the acceleration/deceleration controller 43, and vehicle lateral jerk gain (second gain) Cmn in Expression 3 in the yaw moment controller 44) of "a longitudinal motion associated with lateral motions" so that a first gain and/or a second gain increases when the risk potential is higher than a predetermine value, compared with a case where the risk potential is low, based on the risk potential estimated by the risk potential estimator 41. In other words, when the risk potential is detected by the risk potential estimator 41, the gain adjustor 42 adjusts the gain to become large compared with a case where the risk potential is not detected.

Then, a risk potential quantitative evaluation method will be described with reference to the "Risk Evaluation Method for moving obstacle for safety driving assistance system (http://robotics.iis/u-tokyo.ac.jp/pdf/Safety.pdf: Information studies, the University of Tokyo/Takahiro SUZUKI Lab. Institute of Industrial Science, the University of Tokyo)" (Non-Patent Literature 3).

Figure 9:
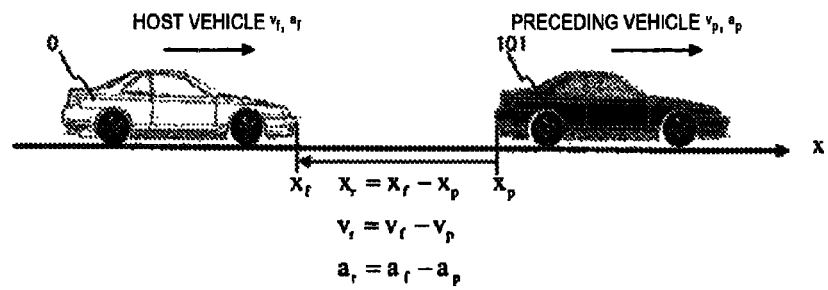
FIG. 9 is a diagram illustrating a relative relationship between a host vehicle and a preceding vehicle.

For example, when a preceding vehicle 101 is traveling in front of the host vehicle 0 which is traveling in an x direction as shown in FIG. 9, and when a position of the host vehicle 0 is represented as xf, a velocity is represented as vf, an acceleration is represented as af, a position of the preceding vehicle 101 is represented as xp, a velocity is represented as vp, and an acceleration is represented as ap, a relative position is xr=xf−xp, a relative velocity is vr=vf−vp, and a relative acceleration is ar=af−ap.

The following risk potentials using these values have been proposed in the related art.

(1) TTC (Time-to-Collision) (Hereinafter, See Expression 6)

$$t_c = -\frac{x_r}{v_r} \qquad [\text{Expression 6}]$$

TTC represents an index for predicting a time until a host vehicle collides with a preceding vehicle on the assumption that a current relative velocity is maintained.

(2) KdB (Approach or Separation State Evaluation Index) (Hereinafter, See Expression 7)

$$KdB = 10 \times \log\left(\frac{v_r}{x_r^3} \times \frac{-2.0}{5.0 \times 10^{-8}}\right) \qquad [\text{Expression 7}]$$

KdB represents an index defined based on a hypothesis that "a driver performs an acceleration or deceleration operation while detecting approach or separation by a visual area change of a preceding vehicle".

(3) THW (Time-Head Way) (Hereinafter, See Expression 8)

$$t_h = -\frac{x_r}{v_f} \qquad [\text{Expression 8}]$$

THW represents an index indicating a time until a host vehicle reaches a current preceding vehicle position at a current host vehicle velocity.

(4) 1/TTC (Inverse Number of Time-to-Collision) (Hereinafter, See Expression 9)

$$t_c^{-1} = \frac{1}{t_c} = -\frac{v_r}{x_r} \qquad [\text{Expression 9}]$$

The inverse number of TTC represents an index which is equivalent to a temporal change of an increasing rate of the size of a preceding vehicle (sight of the preceding vehicle) or a temporal change of a logarithm of an inter-vehicle distance.

(5) RF (Risk Feeling) (Hereinafter, See Expression 10)

$$RF = \frac{a}{t_c} + \frac{b}{t_h} \qquad \text{[Expression 10]}$$

RF represents an index that defines a linear sum of inverse numbers of TTC and THW as a risk that is subjectively felt by a driver in order to express a vehicle velocity control characteristic of the driver during following a preceding vehicle as a physical amount (a and b are predetermined weighting constants).

These risk potentials may be obtained using a stereo camera, or may be obtained using a sensor for measuring a distance to a preceding vehicle, such as a millimeter wave radar or a laser radar. In this example, 1/TTC (inverse number of Time-To-Collision) in Expression 8, which tends to increase according to approach of the host vehicle 0 to the preceding vehicle 101 or an obstacle (not shown), is used.

Figure 10:
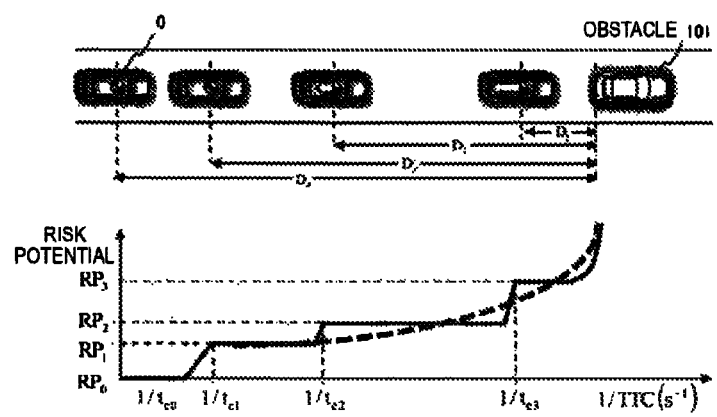
FIG. 10 is a diagram illustrating a relationship between 1/TTC and a risk potential calculated based on a relative relationship with a preceding vehicle.

FIG. 10 schematically shows a relationship between 1/TTC, a relative distance Di to an obstacle, and a collision risk potential. If the distance to the preceding vehicle 101 (or a stationary obstacle) is shortened, 1/TTC increases, and the risk potential increases (here, it is assumed that a relative velocity is uniform).

For example, when the distance to the obstacle is long as D4, 1/TTC is 1/tc0 which is a small value. In this case, the risk potential is RP0. That is, there is no risk (RP0≅0).

On the other hand, if the distance is short, a collision risk rapidly increases, and if the distance is shorter than the distance D1, a risk potential greatly increases. The quantification of the risk potential may be performed in stages as indicated by a solid line in FIG. 10, or may be continuously performed as indicated by a dashed line in FIG. 10. In this way, the quantitative evaluation of the risk potential may be performed by 1/TTC.

FIG. 11 shows an example in which quantitative evaluation of a risk potential using a driver steering operation is performed based on steering angular velocity information output from an in-vehicle steering angle sensor. In general, when emergency steering is performed to avoid collision, a steering velocity is fast. Accordingly, it may be determined that a low steering velocity represents a normal driving operation, and a high steering velocity represents a high risk potential.

A positive steering angular velocity represents a state where the steering increases leftward, and a negative steering angular velocity represents a state where the steering increases rightward.

In FIG. 11, the risk potential is symmetrical with respect to left and right steering angular velocities, but the risk potential may not be symmetrical with respect to the left and right steering angular velocities in the case of "keep right" or "keep left". Further, a two-dimensional map of a steering angle and a steering angular velocity may be used in consideration of counter steering (reverse steering for rapid return from a steering state in a certain direction), instead of the steering angular velocity. Further, the quantification of the risk potential may be performed in stages as indicated by a solid line in FIG. 10, or may be continuously performed as indicated by the dashed line in FIG. 10.

Further, in the present embodiment, although not shown in the figures, a risk potential may be defined as "a risk potential is high when an angular velocity is large" with respect to a pedal angular velocity only on an accelerator-off side and a pedal angular velocity on a brake depression side, so that quantitative evaluation of the risk potential may be performed.

FIG. 12 is a diagram illustrating a correspondence between the quantitative risk potential shown in FIGS. 10 and 11 and a qualitative risk evaluation index, FIG. 13 is a table indicating an operating condition of a system for each quantitative value when a risk potential is quantified in an embodiment of the invention. The ADAS controller 40 collectively manages calculation of operating commands of the system, such as "automatic braking", "adjustment of a longitudinal motion linkage gain associated with lateral motions", "display of multi information display" of the HVI 55, "buzzer", and "vibration relating to a steer reaction force, a pedal reaction force or the like". Hereinafter, the risk potential and the operation of the system will be briefly described.

RP0 represents a "no risk" condition, and a host vehicle is almost in this state in a normal operating condition (the occurrence frequency of this state is high).

In such a condition, it is not necessary to perform an automatic braking control (linear braking which is not associated with lateral motions) for avoiding collision. Further, the "longitudinal motion associated with the lateral motions" has a low possibility of assisting a rapid lateral motion such as emergency detour, and thus, it is important to maintain the size of the lateral motion linkage gain in a range where rolling due to a lateral motion and pitching due to a longitudinal motion do not cause an uncomfortable feeling to a driver.

Further, when the driver applies straight correction steering or performs a smooth lane change (to move to a different lane over time), it is important to prevent generation of an "unsmooth feeling" due to a large amount of deceleration. Further, as an extreme example, if a gain at the moment is set to zero, it is possible to considerably lower the operation frequency of a deceleration actuator during normal operation, and to considerably alleviate the durability condition. Further, with respect to a vehicle in which an inexpensive deceleration actuator with weak NVH performance is mounted, similarly, it is possible to considerably reduce a probability that a trouble occurs in the NVH performance. A vibration control of a multi information display of the HVI 55, a buzzer, a steer reaction force, a pedal reaction force or the like is not performed.

Next, RP1 represents a condition that "there is a possibility of collision", and if this condition is continued as it is without acceleration or deceleration, a host vehicle enters a collision state. Accordingly, it is necessary to promote the driver to apply brakes (including an engine brake) (in this stage, the automatic braking control is not performed).

Here, a preceding vehicle and a message "watch out the front" are displayed in the multi information display, and a buzzer sounds "beep, beep, beep, . . . ", to thereby notify the driver of the possibility of collision. Further, weak vibration is applied to a steer reaction force, a pedal reaction force or the like, to thereby attract driver's attention.

In the case of RP1, the lateral motion linkage gain (here, Cxy) is set to be large compared with the case of RP0, to thereby increase a detour potential for steer detour for avoiding latent collision (when steering is not formed, this condition does not affect the vehicle motion).

If the risk potential becomes RP2, the host vehicle enters a state of "a high possibility of collision", and similar to the technique disclosed Patent Literature 1, even though the driver does not apply brakes, weak automatic braking (alarm braking) is performed. The automatic braking is not associated with a lateral motion, but is associated with Gx_DC in Expression 1. The size of the lateral motion linkage gain is set to be large compared with the case of RP1, to thereby further increase the detour potential for emergency detour. Its display and buzzer are the same as in RP1, but stronger vibration is applied to a steer reaction force and a pedal reaction force, compared with the case of RP1.

Further, RP3 represents a state of "an extremely high possibility of collision", and in this case, strong automatic braking (emergency braking) is performed. Further, the size of the lateral motion linkage gain further increases compared with the case of RP2. The buzzer issues a continuous sound of "beep", and stronger vibration is applied to a steer reaction force and a pedal reaction force, compared with the case of RP2.

Figure 14:
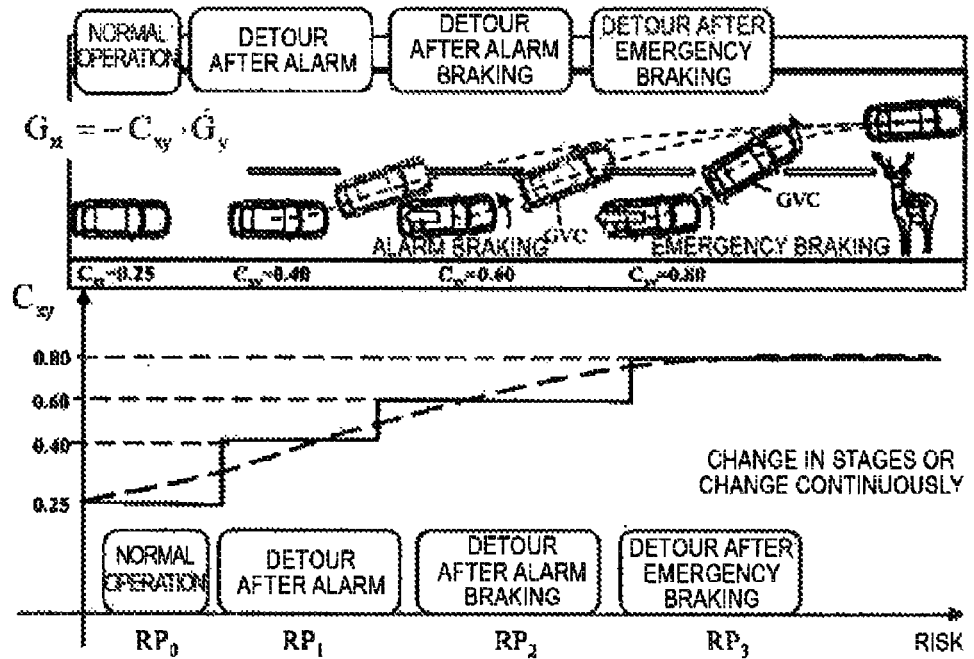
FIG. 14 is a diagram schematically illustrating an operating condition of a vehicle motion control device according to the invention.

FIG. 14 is a diagram schematically illustrating these states. The "longitudinal motion associated with the lateral motions" in this example employs GVC.

In the GVC shown in Expression 1, if the signum, the first-order lag, and the like are omitted, a deceleration command value becomes a value obtained by multiplying the vehicle lateral jerk by $-C_{xy}$ which is a lateral motion linkage gain. As a host vehicle approaches an obstacle (elk in FIG. 14), a gain $C_{xy}$ is set to be large, to thereby perform detour after alarm, detour after alarm braking, and detour after emergency braking.

Further, the gain $C_{xy}$ may be changed in stages to increase according to an increase of the quantified risk potential, or may be changed to continuously increase.

Figure 15:
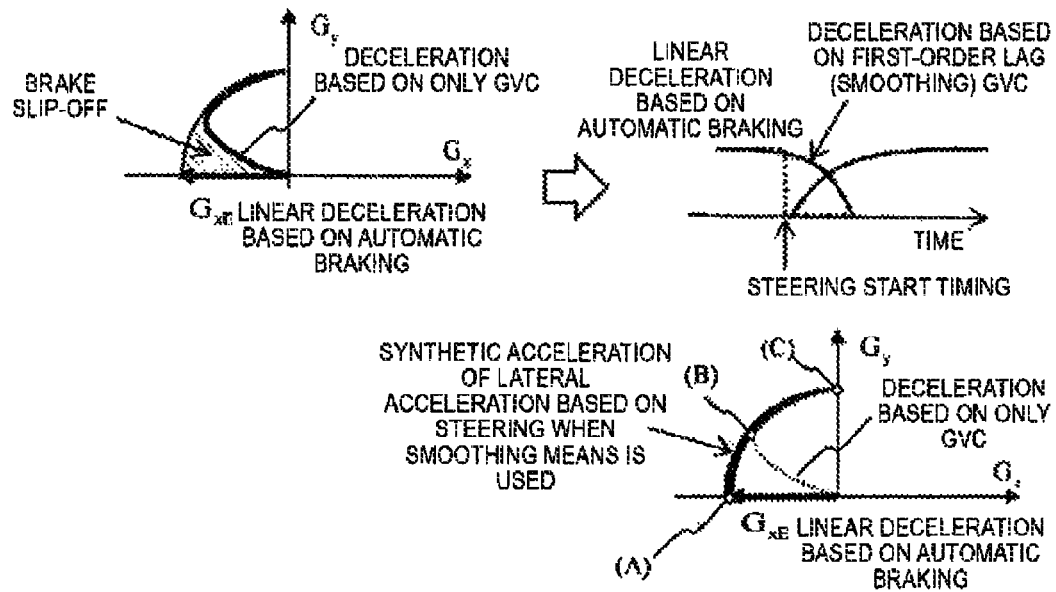
FIG. 15 is a diagram illustrating a linkage condition between linear deceleration due to automatic braking and a longitudinal motion associated with a lateral motion due to GVC.

FIG. 15 is a diagram illustrating a linkage condition between linear deceleration due to automatic braking such as "alarm braking" and "emergency braking" and a longitudinal motion associated with a lateral motion due to GVC.

Particularly, a left part in the figure shows a "g-g" diagram illustrating how a synthetic acceleration vector G (Gx, Gy) of a vehicle transitions, in which a vehicle longitudinal acceleration is represented on an x axis and a vehicle lateral acceleration is represented on a y axis.

As shown in FIG. 14, in the invention, it is necessary to consider "detour after alarm braking" and "detour after emergency braking". As described above, each automatic braking control shown in FIGS. 13 and 14, which is configured with reference to Patent Literature 1, corresponds to linear deceleration in which only a longitudinal motion is controlled.

Accordingly, as shown in the "g-g" diagram in FIG. 15, the deceleration transitions only on the x axis (Gx_DC in Expression 1). On the other hand, the transition of the synthetic acceleration vector G(Gx, Gy) of a deceleration and a lateral acceleration in a GVC single body during a detour operation due to steering, without consideration of the linear deceleration, is indicated as a curve in FIG. 15. The transition starts from the origin. Here, in leftward detour, since a positive lateral acceleration and a longitudinal deceleration associated therewith are applied, when the lateral acceleration increases and the vehicle moves to another vehicle lane, the transition is performed in the fourth quadrant.

On the other hand, as also disclosed in Patent Literature 1, in the automatic braking control such as the alarm braking or emergency braking, when a steering angle of a driver or a steering angular velocity increases, a time for inhibiting the brake control is set, and when a detour operation is started, the automatic braking control is released. Here, the deceleration control associated with the lateral motions is performed by GVC, but an instant fall of the deceleration may occur while the automatic braking control is being released and the deceleration based on GVC is rising. This is referred to as a so-called "G slip-off (brake slip-off)", and causes deterioration of a feeling, and also causes rapid variation in a driver's view point based on pitching or variation in ground load of tires, which may lead to deterioration of detour performance due to steering.

In the invention, for example, the ADAS controller 40 may provide smooth connection during deceleration based on the GVC associated with the lateral motion generated by the steering operation, for example, using smoothing means such as a first-order lag filter (low pass filter) so that the rapid fall (in a step form) does not occur by the linear deceleration command based on the automatic braking at a steering start timing, to thereby perform transition from the linear deceleration (point A) based on the automatic braking to a point C only for the lateral motion through a point B, as shown in FIG. 15.

Thus, it is possible to stabilize the driver's viewpoint, and to reduce the ground load variation, to thereby easily and calmly perform the detour operation even in case of emergency.

Figure 16:
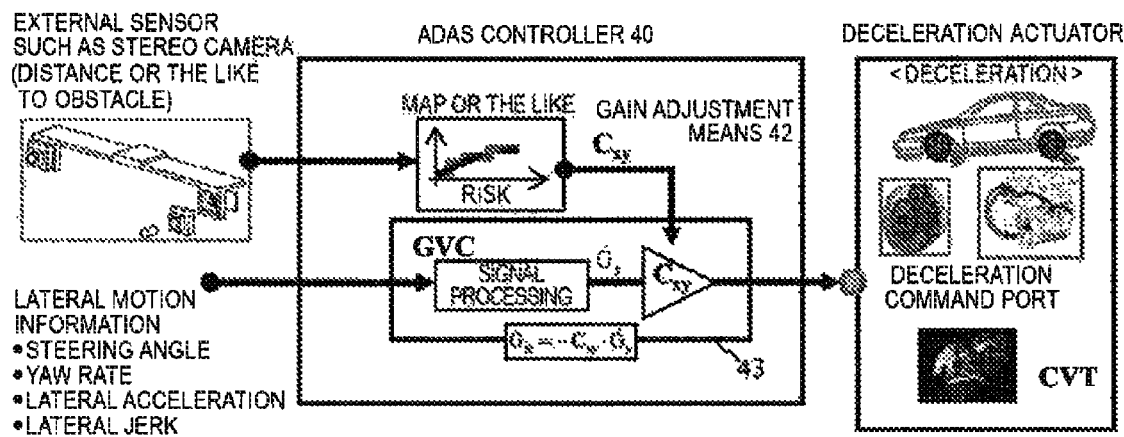
FIG. 16 is a diagram illustrating a concept of a configuration of a vehicle motion control device according to the invention.

FIG. 16 is a conceptual diagram more clearly illustrating a configuration of the vehicle motion control system shown in FIG. 8.

A relative distance, a relative velocity, and a relative velocity with respect to an obstacle are detected using an external sensor such as a stereo camera, and the ADAS controller 40 quantifies a risk potential using the information according to an evaluation standard such as 1/TTL. In the ADAS controller 40, a gain of the acceleration/deceleration controller 43 (GVC controller in FIG. 16) is changed by the gain adjustor 42 configured by a map in which the lateral motion linkage gain $C_{xy}$ of the longitudinal motion (GVC in FIG. 16) associated with the lateral motion is stored according to the risk degree, for example. That is, the gain adjustor 42 may have a configuration in which a gain corresponding to a risk potential estimated using a map in which a gain value based on a risk potential stored in advance is written is output.

The acceleration or deceleration controller 43 receives lateral motion information such as a steering angle, a yaw rate, a lateral acceleration or a lateral jerk, and performs a signal process of forming a deceleration command (calculation of Expression 1).

Further, the ADAS controller 40 transmits the deceleration command to the brake control device, the regenerative brake motor, the CVT, or the like, so that a longitudinal motion control associated with a suitable lateral motion can be realized based on the risk potential. When the driver does not perform the detour operation, the deceleration command associated with the lateral motion is not issued, but the linear brake control based on the risk potential is performed. It should be noted that the system enhances a detour potential when an emergency detour steering operation is performed, but the operation of the longitudinal motion control associated with the lateral motion is not automatically performed, but is initially performed based on a driver's intention (steering operation).

Further, in a detour operation, a driver who tries detour through an advanced driving operation cannot help feeling a possibility that a driver operation and a "longitudinal motion control associated with a lateral motion" cause interference.

For example, in the case of a rear wheel drive vehicle, an accelerator may be fully opened according to a steering operation to reduce a rear wheel lateral force by the driving force, and a yaw motion may be rapidly increased to perform detour, or a parking brake may be operated to lock rear wheels to perform detour in a so-called spin turn state.

In such a case, a predetermined threshold value is provided in an operation amount of the accelerator or the parking brake, and when the operation amount exceeds the threshold value, a lateral motion linkage gain of the "longitudinal motion associated with the lateral motion" is set to be small compared with a gain determined according to a risk potential. Specifically, a longitudinal motion control command associated with the lateral motion includes an acceleration command and a deceleration command. The acceleration command becomes zero when a braking operation command input from the driver exceeds a predetermined threshold value, and the deceleration command becomes zero when an accelerator operation command input from the driver exceeds a predetermined threshold value.

Finally, alleviation of conditions with respect to a deceleration actuator that realizes a longitudinal motion associated with a lateral motion, which is realizable by the invention, will be described with reference to FIG. 17.

In a so-called ESC type deceleration actuator that performs deceleration using a pumped-up oil pressure, which is an example of a deceleration actuator as shown in FIG. 16, a problem frequently occurs in durability of a pump portion, compared with regeneration due to another type of motor, the CVT, or the like. Also, a problem frequently occurs in the noise at the time of operation. In order to solve this problem, it is possible to handle an operation from a normal region using a so-called "premium specification" using a multi-pipe plunger pump or a gear pump. On the other hand, the ESC is obligated in vehicles with a low cost range, but employment of the ESC is not easy due to a restriction in cost. Even in the case of the vehicles in such a low cost range, it is possible to apply the invention to enhance the emergency detour performance.

In the gain adjustor 42 of the ADAS controller 40, if a lateral motion linkage gain is set to "zero" in a state where the risk potential as shown in FIG. 13 is RP0, that is, in a state where there is no risk, even though a lateral motion occurs, a longitudinal motion control command becomes zero, and thus, the deceleration actuator is not operated.

Here, referring to a graph showing a relationship between a highest risk degree and its frequency in FIG. 17, it can be understood that a normal driving condition (with no risk) takes most parts of life-time driving conditions. Accordingly, by setting a gain in the normal operation to zero, it is possible to considerably propose an operation time that greatly affects the durability.

For example, compared with a case where the same gain (normalized gain 1.0) is used from the "no risk" state (RP0) to the "possibility of collision is extremely high" state (RP3) differently from the invention, according to the control method of the invention, the gain increases according to a quantitatively evaluated risk degree. For example, as the risk degree increases, the gain increases as follows. For example, the gain is 0.0 in the case of RP0, 1.0 in the case of RP1, 1.5 in the case of RP2, and 2.0 in the case of RP3. Using this control method, it is possible to reduce a life-time normalized operation time (also, in consideration of an operation strength) by 2.3%. Further, when the risk degree is high, since a small amount of operation sound, vibration and the feeling of jerking forward motion are allowed, even in the case of vehicles in a low cost range, (due to normal mounting of the ESC), it is possible to enhance the emergency detour performance using the invention.

Hereinbefore, a longitudinal motion control associated with a lateral motion is described with respect to a control effect when a lateral motion linkage gain increases, problems in a bodily sensation, and problems in an actuator. Further, a specific risk potential quantification method according to the invention, a lateral motion linkage gain adjustment method based on a risk potential, and effects due to adjustment of a lateral motion linkage gain are described.

According to the invention, it is possible to provide a vehicle motion control device capable of reliably assisting a driver in emergency detour steering without causing a jerking forward motion of the vehicle during normal operation. Further, by setting a gain in a "normal region" where the occurrence frequency is extremely high to zero, it is possible to increase a possibility that a brake actuator with low durability and NVH performance can be employed, and to provide a possibility of realization of the above advantages even in vehicles in a low cost range.

REFERENCE SIGNS LIST

0 VEHICLE
1 ENGINE
2 AUTOMATIC TRANSMISSION
7 POWER STEERING
10 ACCELERATOR PEDAL
11 BRAKE PEDAL
16 STEERING WHEEL
21 LATERAL ACCELERATION SENSOR
22 LONGITUDINAL ACCELERATION SENSOR
23, 24 DIFFERENTIAL CIRCUIT
31 ACCELERATOR POSITION SENSOR
32 BRAKE PEDAL POSITION SENSOR
33 DRIVER STEERING ANGLE SENSOR
38 YAW RATE SENSOR
40 ADAS CONTROLLER
41 RISK POTENTIAL ESTIMATOR
42 LATERAL MOTION LINKAGE GAIN ADJUSTOR
43 LONGITUDINAL ACCELERATION/DECELERATION CONTROLLER
44 MOMENT CONTROLLER
450 BRAKE CONTROLLER
451 ESC CONTROLLER
452 FOUR-WHEEL BRAKING FORCE DISTRIBUTION ADJUSTOR
45 STEERING CONTROLLER
46 POWER TRAIN CONTROLLER
48 PEDAL CONTROLLER
51 ACCELERATOR REACTION FORCE MOTOR
52 BRAKE PEDAL REACTION FORCE MOTOR
53 STEERING REACTION FORCE MOTOR
61 LEFT FRONT WHEEL
62 RIGHT FRONT WHEEL
63 LEFT REAR WHEEL
64 RIGHT REAR WHEEL
70 STEREO CAMERA
701 STEREO IMAGE PROCESSING UNIT

The invention claimed is:
1. A vehicle motion control device comprising:
a risk potential estimator that estimates a risk potential of a vehicle based on input external information and vehicle information;

a vehicle longitudinal motion controller that generates a longitudinal motion control command of the vehicle based on a vehicle lateral jerk and a predetermined gain; and a gain adjustor that adjusts the gain, wherein the gain adjustor adjusts the gain based on the risk potential estimated by the risk potential estimator, the vehicle longitudinal motion controller includes an acceleration/deceleration controller that calculates a longitudinal acceleration command value of the vehicle based on the vehicle lateral jerk and a predetermined first gain, and outputs the longitudinal acceleration command value, a yaw moment controller that calculates a yaw moment command value of the vehicle based on the vehicle lateral jerk and a predetermined second gain, and outputs the yaw moment command value, the gain adjustor adjusts the first gain or the second gain based on the risk potential estimated by the risk potential estimator.

2. The vehicle motion control device according to claim 1, wherein when the risk potential is detected by the risk potential estimator, the gain adjustor adjusts the gain to be large, compared with a case where the risk potential is not detected.

3. The vehicle motion control device according to claim 1, wherein when the risk potential estimated by the risk potential estimator is higher than a predetermined value, the gain adjustor adjusts the first gain or the second gain to be large, compared with a case where the value is lower than the predetermined value.

4. The vehicle motion control device according to claim 1, wherein the gain adjustor adjusts the first gain and the second gain based on the risk potential estimated by the risk potential estimator.

5. The vehicle motion control device according to claim 2, wherein when the risk potential is not detected, the gain adjustor adjusts the gain to be zero.

6. The vehicle motion control device according to claim 1, wherein the external information is host vehicle front external information obtained from a camera or a radar, and the vehicle information is at least one piece of information among a vehicle velocity, a steering angle, an acceleration, a yaw rate, a pedal operation velocity, and a braking operation velocity.

7. The vehicle motion control device according to claim 1, wherein the risk potential estimator estimates quantitative evaluation of the risk potential of the vehicle.

8. The vehicle motion control device according to claim 1, wherein the quantitative evaluation of the risk potential of the vehicle is performed by quantification based on a time-to-collision or a steering angular velocity.

9. The vehicle motion control device according to claim 1, wherein the gain adjustor outputs the gain corresponding to the estimated risk potential using a map in which a value of the gain depending on a risk potential which is stored in advance is written.

10. The vehicle motion control device according to claim 1, wherein the vehicle longitudinal motion controller generates the longitudinal motion control command of the vehicle so that the vehicle is decelerated when an absolute value of a lateral acceleration of the vehicle increases, and is accelerated when the absolute value of the lateral acceleration of the vehicle decreases.

11. The vehicle motion control device according to claim 1, wherein the vehicle longitudinal motion controller generates the longitudinal motion control command of the vehicle so that the vehicle is decelerated when an absolute value of a steering angle of the vehicle increases, and is accelerated when the absolute value of the steering angle of the vehicle decreases.

12. The vehicle motion control device according to claim 1, wherein the longitudinal acceleration command value Gxc is as follows:

$$G_{xc} = -\mathrm{sgn}(G_y \cdot \dot{G}_y)\frac{C_{xy}}{1+Ts}|\dot{G}_y| + G_{x\_DC},$$

wherein Gy: vehicle lateral acceleration, Gy_dot: vehicle lateral jerk, Cxy: lateral jerk gain, T: first-order lag time constant, s: Laplace operator, Gx_DC: offset.

13. The vehicle motion control device according to claim 1, wherein the yaw moment command value is generated to promote turning of the vehicle when an absolute value of a lateral acceleration of the vehicle increases, and to return the turning of the vehicle when the absolute value of the lateral acceleration of the vehicle decreases.

14. The vehicle motion control device according to claim 1, wherein the yaw moment command value is generated to promote turning of the vehicle when an absolute value of a steering angle of the vehicle increases, and to return the turning of the vehicle when the absolute value of the steering angle of the vehicle decreases.

15. The vehicle motion control device according to claim 1, wherein the yaw moment command value Mz+ is as follows:

$$M_{z+} = \mathrm{sgn}(G_y \cdot \dot{G}_y)\frac{C_{mnl}}{1+T_{mn}s}|\dot{G}_y|,$$

wherein Gy: vehicle lateral acceleration, Gy dot: vehicle lateral jerk, Cmnl: lateral jerk gain, Tmn: first-order lag time constant, and s: Laplace operator.

16. The vehicle motion control device according to claim 1, wherein the yaw moment command value Mz+/V is as follows:

$$M_{z+/V} = \mathrm{sgn}(G_y \cdot \dot{G}_y)\frac{C_{mnl}}{1+T_{mn}s}\left|\frac{\dot{G}_y}{V}\right|,$$

wherein Gy: vehicle lateral acceleration, Gy dot: vehicle lateral jerk, Cmnl: lateral jerk gain, Tmn: first-order lag time constant, s: Laplace operator, and V: vehicle velocity.

17. The vehicle motion control device according to claim 1,
wherein the longitudinal motion control command includes an acceleration command and a deceleration command,
the acceleration command becomes zero when a braking operation command input from a driver exceeds a predetermined threshold value, and
the deceleration command becomes zero when an accelerator operation command input from the driver exceeds a predetermined threshold value.

18. The vehicle motion control device according to claim 1,
wherein the risk potential estimator estimates the risk potential of the vehicle based on information about a distance to an obstacle obtained from a stereo camera.

* * * * *